(12) United States Patent
Takahashi

(10) Patent No.: US 10,652,420 B2
(45) Date of Patent: May 12, 2020

(54) ELECTRONIC APPARATUS AND NON-TRANSITORY COMPUTER-READABLE RECORDING MEDIUM FOR EFFICIENTLY EXECUTING SETTING CHANGES AFTER SETUP COMPLETION

(71) Applicant: KYOCERA Document Solutions Inc., Osaka (JP)

(72) Inventor: Minoru Takahashi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/416,178

(22) Filed: May 18, 2019

(65) Prior Publication Data

US 2019/0356807 A1 Nov. 21, 2019

(30) Foreign Application Priority Data

May 18, 2018 (JP) .................. 2018-096035

(51) Int. Cl.
*G06F 3/12* (2006.01)
*H04N 1/00* (2006.01)

(52) U.S. Cl.
CPC ..... *H04N 1/00973* (2013.01); *H04N 1/00344* (2013.01); *H04N 1/00477* (2013.01); *H04N 1/00954* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 2004/0008832 A1* | 1/2004 | Mashimo | H04M 3/42195 379/210.01 |
| 2010/0208295 A1* | 8/2010 | Sato | G06F 3/1285 358/1.15 |
| 2014/0002838 A1* | 1/2014 | Imine | H04N 1/00228 358/1.13 |
| 2014/0043633 A1* | 2/2014 | Hagiuda | H04N 1/00973 358/1.13 |

FOREIGN PATENT DOCUMENTS

JP 2000-207341 A 7/2000

\* cited by examiner

*Primary Examiner* — Henok Shiferaw
(74) *Attorney, Agent, or Firm* — Hawaii Patent Services; Nathaniel K. Fedde; Krenton N. Fedde

(57) ABSTRACT

Provided is an electronic apparatus that efficiently executes a setting change after setup completion. A reservation information management unit manages reservation information including a reservation date and time of a setting change after setup completion set by a setup terminal, and an IP address and/or a default gateway. A system control unit, after receiving a notification from the reservation information management unit indicating that the reservation date and time have been reached, executes a process of a setting change according to the contents of the setting change. In addition, the system control unit, after receiving the notification from the reservation information management unit, causes a panel unit to display a reservation notification screen, and after receiving the start of the setting change via the reservation notification screen, executes the process of the setting change.

4 Claims, 5 Drawing Sheets

FIG.3A

(RESERVATION INFORMATION)

| RESERVATION DATE AND TIME | IP ADDRESS | DEFAULT GATEWAY |
|---|---|---|
| YEAR/MONTH/DAY 12:00 | *.*.. | *.*.. |

501, 502, 503, 500

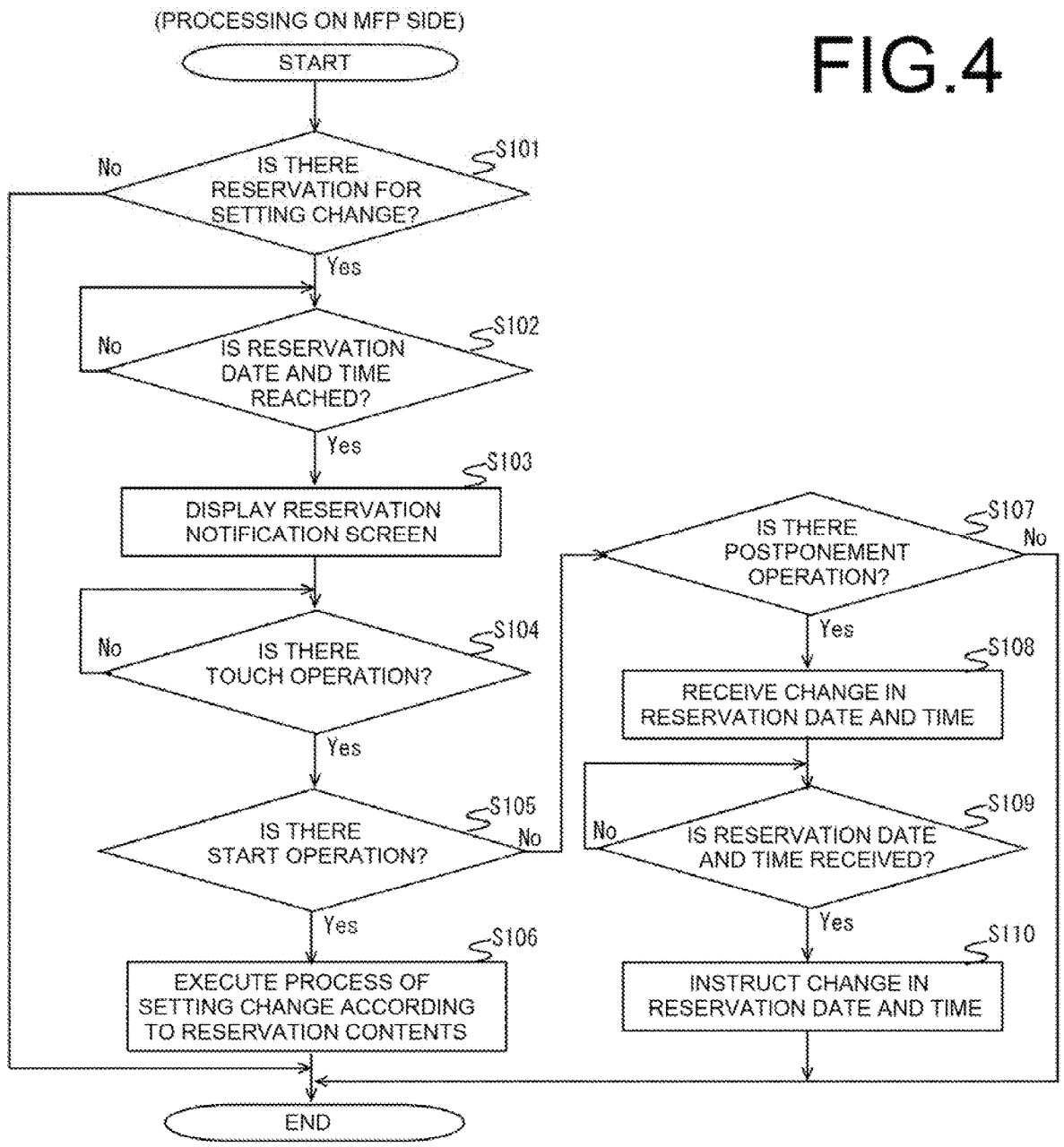

ELECTRONIC APPARATUS AND NON-TRANSITORY COMPUTER-READABLE RECORDING MEDIUM FOR EFFICIENTLY EXECUTING SETTING CHANGES AFTER SETUP COMPLETION

INCORPORATION BY REFERENCE

This application is based on and claims the benefit of priority from Japanese Patent Application No. 2018-096035 filed on May 18, 2018, the contents of which are hereby incorporated by reference.

BACKGROUND

The present disclosure relates to an electronic apparatus and a non-transitory computer-readable recording medium suitable for setting up an electronic apparatus, for example.

For example, an image forming apparatus such as an MFP (Multifunction Peripheral) or the like is one kind of electronic apparatus. There are models of image forming apparatuses that are equipped with a printing function, a copy function, a facsimile (FAX) function, a scanner function, a data transmission/reception function via a network, and the like. Incidentally, in a case of such an image forming apparatus, for example, setup is required when the image forming apparatus is first used.

Related to such setups, typical technology includes the following kinds of network devices. In other words, the controller of a network device reads setting information from a network interface, rewrites setting values that are held internally, and notifies the network interface regarding the setting information. In addition, in a case of rewriting the setting values, the controller notifies the network interface that restarting is necessary.

SUMMARY

The electronic apparatus according to the present disclosure includes a panel unit, a reservation information management unit, and a system control unit. The reservation information management unit manages reservation information including a time of a setting change after setup completion set by a setup terminal and contents of the setting change. The system control unit, after receiving a notification from the reservation information management unit indicating that the time has been reached, executes a process of the setting change according to the contents of the setting change. In addition, the system control unit, after receiving the notification from the reservation information management unit, causes the panel unit to display a reservation notification screen, and after receiving a start of the setting change via the reservation notification screen, executes the process of the setting change.

The non-transitory computer-readable recording medium according to the present disclosure stores a network setting program executable by a computer of an electronic apparatus. When the computer executes the network setting program; a reservation information management unit manages reservation information including a time of a setting change after setup completion set by a setup terminal and contents of the setting change. A system control unit, after receiving a notification from the reservation information management unit indicating that the time has been reached, executes a process of the setting change according to the contents of the setting change. Furthermore, the system control unit, after receiving the notification from the reservation information management unit, causes a panel unit to display a reservation notification screen, and after receiving a start of the setting change via the reservation notification screen, executes the process of the setting change.

BRIEF DESCRIPTION OF THE DRAWINGS

FIG. 3A is a diagram for describing a setting change reservation of the MFP in FIG. 1, and illustrates an example of reservation information managed by the reservation information management unit in FIG. 2.

FIG. 4 is a flowchart for describing processing on the MFP side in FIG. 1.

DETAILED DESCRIPTION

Hereinafter, an embodiment of an electronic apparatus according to the present disclosure will be described with reference to FIGS. 1 to 4. Note that in the following description, it is presumed that the electronic apparatus is an MFP Multifunction Peripheral) that is a complex peripheral apparatus equipped with a printing function, a copy function, a FAX function, a data transmission/reception function via a network, and the like.

Figure 1:
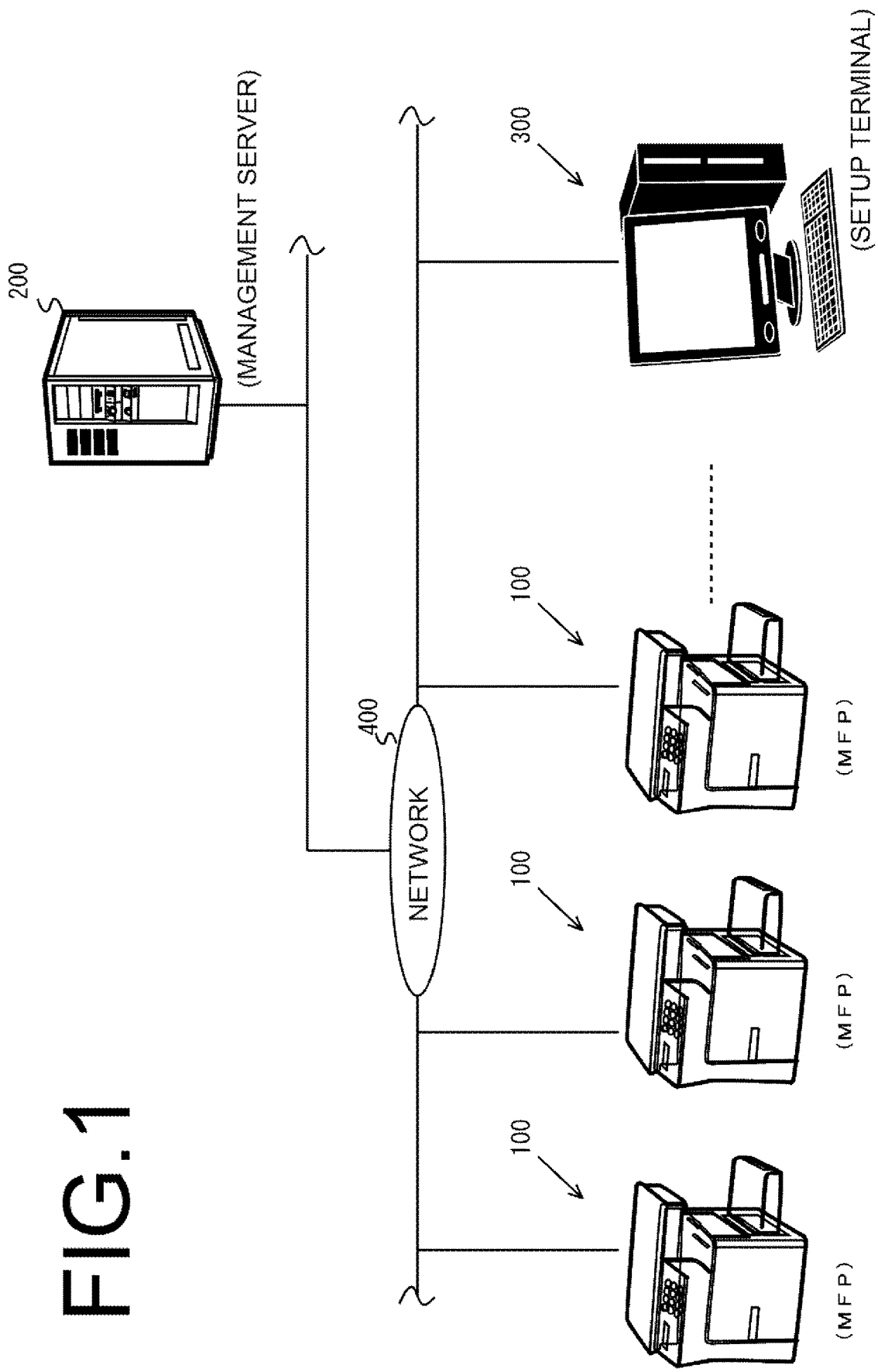
FIG. 1 is a diagram for describing an embodiment of an electronic apparatus according to the present disclosure.

First, FIG. 1 illustrates a configuration for executing setup (for example, language setting, output setting such as copying and the like, address book registration, and the like) of a MFP 100 before delivery to a client with contents according to a request from the client. In addition, FIG. 1 illustrates a configuration for collectively setting up a plurality of MFPs 100 via a network when the number of MFPs 100 to be delivered to a client is large.

In other words, the MFPs 100 are connected to the management server 200 and the setup terminal 300 via a network 400 such as a LAN (Local Area Network) or the like. The management server 200 automatically assigns setting information necessary for network use such as an IP (Internet Protocol) address or the like for each MFP 100 connected via the network 400. Note that it is presumed that an IP address assigned by the management server 200 is a private IP address. Hereinafter, a private IP address will be simply described as an IP address.

The setup terminal 300, via the network 400, specifies the IP addresses assigned by the management server 200 and connects to each MFP 100, then collectively performs setup for each MFP 100 with contents according to a request from the client. Incidentally, in a case where there is a specification of connection information such as an IP address or the like from the client, the MFP 100 holds the reservation information 500 illustrated in FIG. 3A (described later) that is set by the setup terminal 300. This will be described in detail later.

Figure 2:
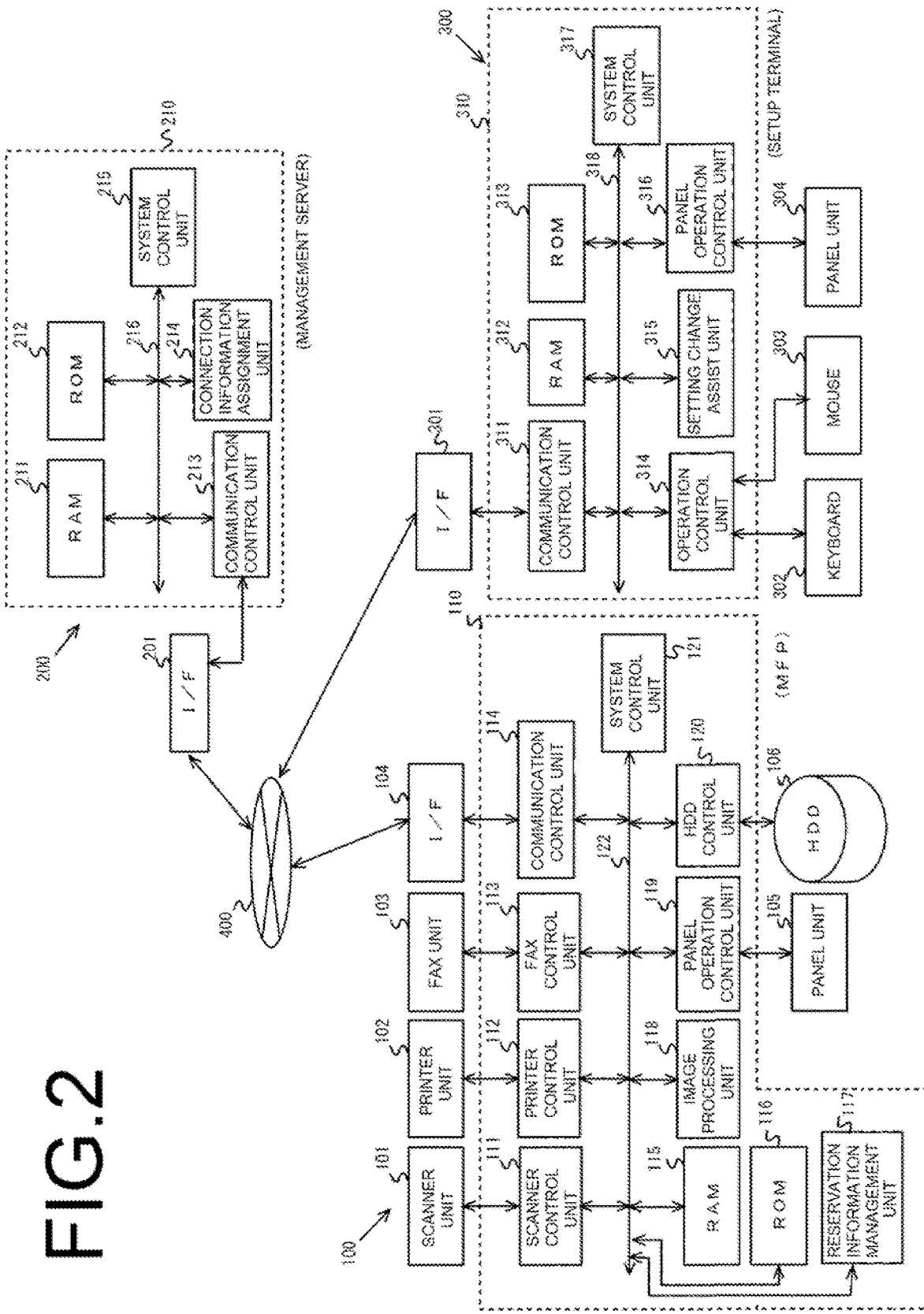
FIG. 2 is a diagram for describing an example of a configuration of the MFP, the management server, and the setup terminal in FIG. 1.

Next, an example of the configuration of the MFP 100, the management server 200, and the setup terminal 300 will be described with reference to FIG. 2.

First, an MFP 100 includes a control unit 110 that controls operations of a scanner unit 101, a printer unit 102, a FAX (Facsimile) unit 103, an I/F (interface) 104, a panel unit 105, and a HDD 106.

The scanner unit 101 is a device that converts an image of a document read by an image sensor into digital image data, and inputs the image data to the control unit 110. The printer unit 102 is a device that prints an image on paper based on printing data outputted from the control unit 110. The FAX unit 103 is a device that transmits data outputted from the control unit 110 to a facsimile of another party via a telephone line, and receives data from a facsimile of another party, and inputs that data to the control unit 110.

The I/F 104 is in charge of communication via the network 400 with the management server 200, other MFPs 100, the setup terminal 300, and the like. It should be noted that the I/F 104 may also be in charge of communication via the network 400 with a content server, a web server, and the like. The panel unit 105 is a device such as a touch panel or the like for performing a selection of the printing function, the copy function, the FAX function, the data transmission/reception function via a network, and for displaying various settings of the MFP 100. The HDD 106 is a storage device that stores application programs and the like for providing various functions of the MFP 100.

The control unit 110 is a processor that controls the overall operation of the MFP 100 by executing application programs for the printing function, the copy function, the FAX function, the data transmission/reception function via a network, and the like, the image forming program, the control program, and the like. The control unit 110 includes a scanner control unit 111, a printer control unit 112, a FAX control unit 113, a communication control unit 114, a RAM (Random Access Memory) 115, a ROM (Read-Only Memory) 117, an image processing unit 118, a panel operation control unit 119, an HDD control unit 120, and a system control unit 121. In addition, these are connected to the data bus 122.

The scanner control unit 111 controls the reading operation of the scanner unit 101. The printer control unit 112 controls the printing operation of the printer unit 102. The FAX control unit 113 controls the data transmission/reception operation by the FAX unit 103. The communication control unit 114, via the I/F 104, controls transmission and reception of data and the like via the network 400. The RAM 115 is a work memory for executing a program. In addition, the RAM 115 stores the printing data that has undergone image processing by the image processing unit 118. The ROM 116 stores control programs and the like for checking the operation of each unit and the like. The reservation information management unit 117 holds reservation information 500 illustrated in FIG. 3A, which will be described later, that is set by the setup terminal 300. Moreover, when the reservation date and time 501 of the reservation information 500 is reached, the reservation information management unit 117 notifies the system control unit 121 that the reservation date and time 501 have been reached.

The image processing unit 118 performs image processing (rasterizing) on the image data read by the scanner unit 101, for example. Note that the system control unit 121 temporarily stores printing data that has undergone image processing by the image processing unit 118 in the RAM 115. The panel operation control unit 119 controls the display operation of the panel unit 105. In addition, the panel operation control unit 119, via the panel unit 105, receives settings and the like such as start of printing, copying, FAX, data transmission/reception via the network 400, and the like. Moreover, the panel operation control unit 119, according to an instruction from the system control unit 121, causes the panel unit 105 to display a reservation notification screen 105A illustrated in FIG. 3B to be described later.

Figure 3B:
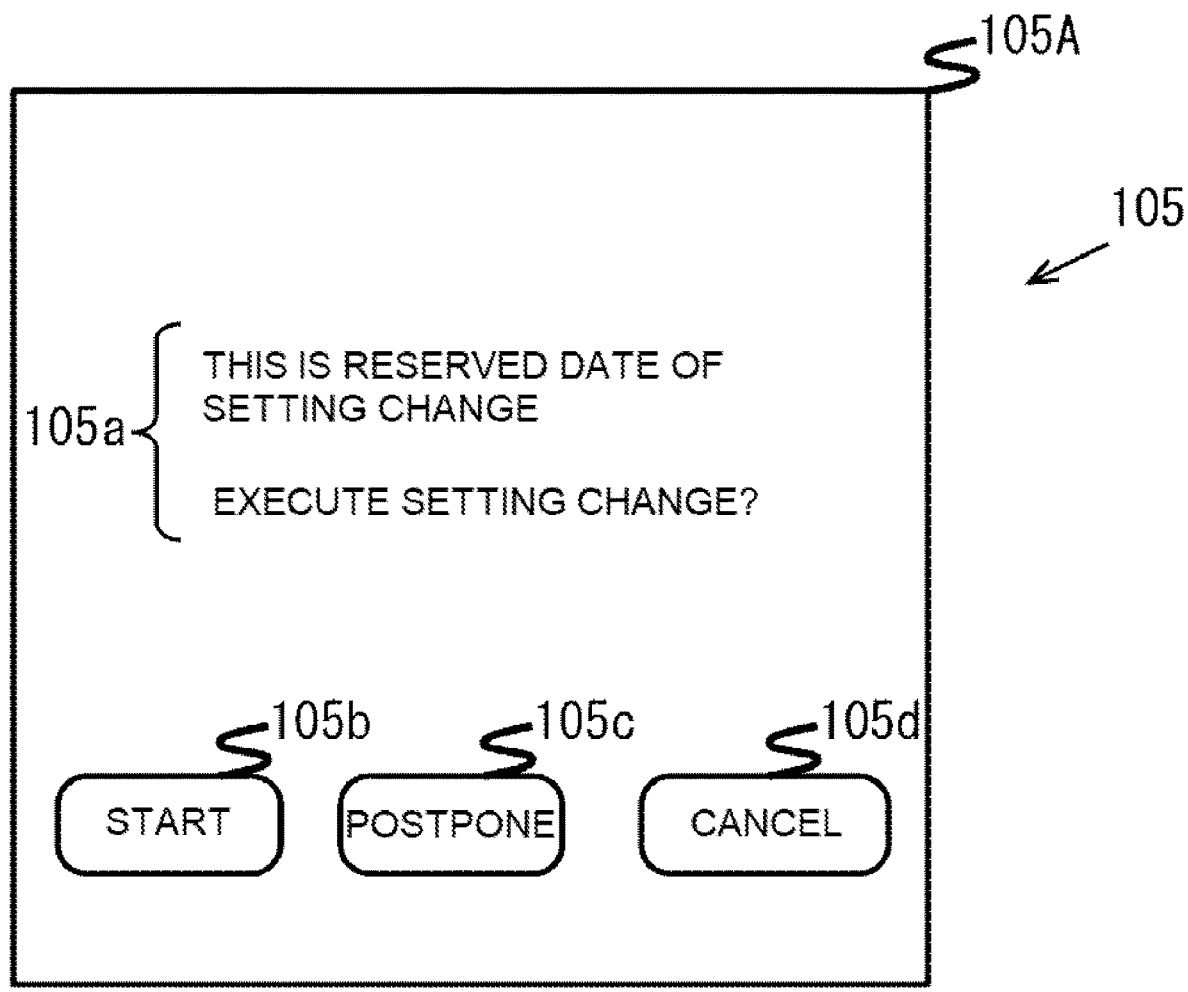
FIG. 3B is a diagram for describing a setting change reservation of the MFP in FIG. 1, and illustrates an example of a reservation notification screen displayed on the panel unit in FIG. 2.

The system control unit 121 controls the cooperative operation and the like of each unit. Moreover, after receiving a notification from the reservation information management unit 117 indicating that the reservation date and time 501 have been reached, the system control unit 121 instructs the panel operation control unit 119 to display a reservation notification screen 105A as illustrated in FIG. 3B described later on the panel unit 105. In addition, the system control unit 121, as will be described in detail later, executes processing corresponding to any one of the start button 105b, the postponement button 105c, and the cancel button 105d selected on the reservation notification screen 105A.

The management server 200 includes a control unit 210 that controls the I/F 201. The I/F 201 is in charge of communication via the network 400 with the MFP 100, the setup terminal 300, and the like. The control unit 210 is a processor that controls the overall operation of the management server 200 by executing application programs, control programs, and the like. The control unit 210 includes a RAM 211, a ROM 212, a communication control unit 213, a connection information assignment unit 214, and a system control unit 215. In addition, these are connected to a data bus 216.

The RAM 211 is a work memory for executing a program. The ROM 212 stores a control program for checking operation of each unit and the like. The communication control unit 213, via the I/F 201, controls transmission and reception of data and the like with the MFP 100 and the setup terminal 300 via the network 400. In accordance with an instruction from the setup terminal 300, the connection information assignment unit 214 assigns an IP address (for example, a private IP address) to each MFP 100.

When the system control unit 215 receives an instruction from the setup terminal 300 via the communication control unit 213, the system control unit 215 instructs the connection information assignment unit 214 to assign an IP address to each MFP 100. Incidentally, the system control unit 215 executes assignment of an IP address to each MFP 100 based on the IP addresses assigned by the connection information assignment unit 214.

The setup terminal 300 includes a control unit 310 that controls an I/F 301, a keyboard 302, a mouse 303, and a panel unit 304. The I/F 301, via the network 400, performs transmission and reception of data between the MFP 100 and the management server 200. The keyboard 302 is a device for inputting characters and the like. The mouse 303 is a device for instructing a character input position or the like. The panel unit 304 displays information and the like related to the setup of the MFP 100.

The control unit 310 is a processor that controls the overall operation of the setup terminal 300 by executing a control program or the like. The control unit 310 includes a communication control unit 311, a RAM 312, a ROM 313, an operation control unit 314, a setting change assist unit 315, a panel operation control unit 316, and a system control unit 317. In addition, these are connected to a data bus 318.

The communication control unit 311, via the I/F 301, controls transmission and reception of data and the like with the MFP 100 and the management server 200. The RAM 312 is a work memory for executing a program. The ROM 313 stores a control program for performing an operation check or the like of each unit.

The operation control unit 314 controls input of characters and the like of the keyboard 302, and instructions of input positions and the like of characters of the mouse 303. The setting change assist unit 315, via the panel operation control unit 316, causes the panel unit 304 to display content for assisting in a procedure or the like for collectively setting up the MFPs 100. The panel operation control unit 316 controls the display operation of the panel unit 304.

The system control unit 317 controls the cooperative operation of each unit. In addition, when the panel operation control unit 316, via the panel unit 304, receives an instruction for assigning the IP addresses of the MFPs 100, the system control unit 317 requests the management server 200 to assign the IP addresses of the MFPs 100. Moreover, when the panel operation control unit 316, via the panel unit 304, receives an instruction such as a procedure or the like for collectively setting up the MFPs 100, the system control unit 317 instructs setup for each MFP 100.

Next, the setting change reservation of the MFP 100 will be described with reference to FIGS. 3A and 3B. First, FIG. 3A illustrates an example of reservation information 500 managed by the reservation information management unit 117 of the MFP 100. The reservation information 500 illustrated in FIG. 3A includes a reservation date and time 501 as a setting change time, an IP address 502 of a MFP 100 at the client site, and a default gateway 503 used at the client site. Note that although a case is presumed here in which the default gateway 503 is included, the default gateway 503 may not be included. The reservation date and time 501, the IP address 502, and the default gateway 503 are all requests from the client, and are set by the setup terminal 300 at the time of collective setup. In other words, a setting change to connection information indicated by the IP address 502 and the default gateway 503 is set on the date and time indicated by the reservation date and time 501. In other words, the IP address and default gateway are not changed at the time of collective setup. Therefore, the connected state of the MFP 100 and setup terminal 300 is maintained. Here, after the setup of the MFP 100 is completed, the system control unit 317 determines whether the reservation date and time 501 is a time later than the date and time of setup completion. Then, in a case where the determination result is "NO", re-reservation of the setting change may be requested by a display of the panel unit 304 by the panel operation control unit 316.

FIG. 3B illustrates an example of the reservation notification screen 105A displayed on the panel unit 105. On the reservation notification screen 105A, content 105a for prompting a setting change, a start button 105b, a postponement button 105c and a cancel button 105d are displayed. Here, for example, when the start button 105b is touch-operated, the system control unit 121 changes the setting of the IP address 502 and the connection information of the default gateway 503 based on the reservation information 500 managed by the reservation information management unit 117.

Moreover, for example, when the postponement button 105c is touch-operated, the system control unit 121, via the panel operation control unit 119, causes the panel unit 105 to display a change screen for receiving a change of the reservation date and time 501. Furthermore, when the reservation date and time 501 is changed on the change screen, the system control unit 121 causes the reservation information management unit 117 to change the reservation date and time 501 of the reservation information 500. In addition, when the cancel button 105d is touch-operated, for example, the contents of the reservation date and time 501 of the reservation information 500, the IP address 502, and the default gateway 503 are cleared.

Next, processing on the MFP 100 side will be described with reference to FIG. 4. Incidentally, in the following description, a case is presumed in which the reservation information 500 in FIG. 3A that is set by the setup terminal 300 is managed by the reservation information management unit 117 after collective setup of the MFPs 100 is completed. In other words, a case is described in which the MFPs 100 for which collective setup has been completed are delivered to the client.

(Step S101)

The system control unit 121 determines whether or not there is a reservation for a setting change.

In this case, the system control unit 121 inquires of the reservation information management unit 117 whether or not there is a reservation for a setting change, and after receiving a notification indicating that there is no reservation for a setting change, determines that there is no reservation for a setting change. (step S101: NO), and the process ends.

On the other hand, the system control unit 121 inquires of the reservation information management unit 117 whether or not there is a reservation for a setting change, and after receiving a notification indicating that there is a reservation for a setting change, determines that there is a reservation for a setting change. (step S101: YES), and the process moves to step S102.

Here, when the reservation information management unit 117 does not hold the reservation information 500 illustrated in FIG. 3A, the reservation information management unit 117 notifies the system control unit 121 that there is no reservation for a setting change. In addition, when the reservation information management unit 117 holds the reservation information 500 illustrated in FIG. 3A, the reservation information management unit 117 notifies the system control unit 121 that there is a reservation for a setting change.

(Step S102)

The system control unit 121 determines whether or not the time is the reservation date and time 501.

In this case, when there is no notification from the reservation information management unit 117 indicating that the reservation date and time 501 of the reservation information 500 has been reached, the system control unit 121 determines that the time is not the reservation date and time 501 (step S102: NO).

On the other hand, when there is a notification from the reservation information management unit 117 indicating that the reservation date and time 501 of the reservation information 500 has been reached, the system control unit 121 determines that the time is the reservation date and time 501 (step S102: YES), and the process moves to step S103.

(Step S103)

The system control unit 121 causes the reservation notification screen 105A to be displayed.

In this case, the system control unit 121, via the panel operation control unit 119, causes the panel unit 105 to display the reservation notification screen 105A.

(Step S104)

The system control unit 121 determines whether or not there is a touch operation.

In this case, when there is no notification from the panel operation control unit 119 indicating that there is a touch operation on the panel unit 105, the system control unit 121 determines that there is no touch operation (step S104: NO).

On the other hand, when there is a notification from the panel operation control unit 119 indicating that there is a touch operation on the panel unit 105, the system control unit 121 determines that there is a touch operation (step S104: YES), and the process moves to step S105.

(Step S105)

The system control unit 121 determines whether or not it is a start operation.

In this case, when there is a notification from the panel operation control unit 119 indicating that the touch operation on the panel unit 105 is something other than the start button 105*b*, the system control unit 121 determines it is not a start operation (step S105: NO).

On the other hand, when there is a notification from the panel operation control unit 119 indicating that the touch operation on the panel unit 105 is the start button 105*b*, the system control unit 121 determines it is a start operation (step S105: YES), and the process moves to step S106.

(Step S106)

The system control unit 121 executes the process of setting change according to the reservation contents of the reservation information 500.

In this case, the system control unit 121 changes the setting of the IP address 502 and the connection information of the default gateway 503 based on the reservation information 500 managed by the reservation information management unit 117.

(Step S107)

The system control unit 121 determines whether or not there is a postponement operation.

In this case, when there is a notification from the panel operation control unit 119 indicating that the touch operation on the panel unit 105 is something other than the postponement button 105*c*, the system control unit 121 determines there is not a postponement operation (step S107: NO).

Note that when the touch operation on the panel unit 105 from the panel operation control unit 119 is something other than the postponement button 105*c*, the touch operation on the panel unit 105 from the panel operation control unit 119 is the cancel button 105*d*, so the system control unit 121 determines there is a cancellation.

In this case, the system control unit 121 causes the reservation information management unit 117 to delete the contents of the reservation date and time 501 of the reservation information 500, the IP address 502, and the default gateway 503 in response to the touch-operated cancel button 105*d*. As a result, the reservation of the setting change is eliminated.

On the other hand, when there is a notification from the panel operation control unit 119 indicating that the touch operation on the panel unit 105 is the postponement button 105*c*, the system control unit 121 determines that there is a postponement operation (step S107: YES), and the process moves to S108.

(Step S108)

The system control unit 121 causes the change of the reservation date and time 501 to be received.

In this case, the system control unit 121, via the panel operation control unit 119, causes the panel unit 105 to display a change screen for receiving a change of the reservation date and time 501.

In addition, the system control unit 121 causes the panel operation control unit 119 to receive the change of the reservation date and time 501.

As described above, since the system control unit 121 causes the panel operation control unit 119 to receive the change of the reservation date and time 501, the schedule of the implementation date of the setting change may be flexibly changed.

(Step S109)

The system control unit 121 determines whether or not the panel operation control unit 119 has received a change of the reservation date and time 501.

In this case, when there is no notification indicating that the panel operation control unit 119 has received the change of the reservation date and time 501 on the change screen, the system control unit 121 determines that the panel operation control unit 119 has not received the change of the reservation date and time 501 (step S109: NO).

On the other hand, when there is a notification indicating that the panel operation control unit 119 has received the change of the reservation date and time 501 on the change screen, the system control unit 121 determines that the panel operation control unit 119 has received the change of the reservation date and time 501 (step S109: YES), and the process moves to step S110.

(Step S110)

The system control unit 121 causes the reservation date and time 501 of the reservation information 500 to be changed.

In this case, when the panel operation control unit 119 receives a change of the reservation date and time 501 on the change screen, the system control unit 121 causes the reservation information management unit 117 to change the reservation date and time 501 of the reservation information 500.

Note that this is a case when a notification is received from the panel operation control unit 119 in step S105 indicating that the touch operation on the panel unit 105 is the start button 105*b*, and the system control unit 121 executes a process in step S106 to change the setting according to the reservation contents. However, the embodiment is not limited to this example, and when there is a notification from the reservation information management unit 117 in step S102 indicating that the reservation date and time 501 of the reservation information 500 has been reached, the setting change process according to the reservation contents may be executed immediately in step S106. In this case, the setting change may be automatically performed after setup by the setup terminal 300 is completed.

As described above, in the present embodiment, the reservation information management unit 117 manages the reservation information 500 including the reservation date and time 501 of the setting change after the setup set by the setup terminal 300 is complete and the IP address 502 and/or the default gateway 503 (contents of the setting change), and after the system control unit 121 receives a notification from the reservation information management unit 117 indicating that the reservation date and time 501 has been reached, the system control unit 121 executes the process of the setting change according to the contents of the setting change. Moreover, after the system control unit 121 receives the notification from the reservation information management unit 117, the system control unit 121 causes the panel unit 105 to display the reservation notification screen 105A, and after the start of the setting change is received via the reservation notification screen 105A, the system control unit 121 executes the process of the setting change.

As a result, when the reservation date and time 501 included in the reservation information 500 is reached after setup completion by the setup terminal 300, the start of the setting change is received and the process of the setting change is executed, so the setting change after setup completion may be efficiently executed.

Incidentally, in the above-described embodiment, the settings of the IP address 502 and the default gateway 503 are changed based on the reservation date and time 501. However, the settings may be changed based on a time other than the reservation date and time 501, for example, the first starting of the MFP 100 after setup completion, or the first starting on the delivery date of the MFP 100. In this case, in the description of the above embodiment, instead of the "reservation date and time 501", the "first starting of the MFP 100 after setup completion" or the "first starting on the delivery date of the MFP 100 after setup completion" may be applied.

Moreover, in the present embodiment, the electronic apparatus is a MFP 100, however, the embodiment is not limited to this example, and may be applied to other electronic apparatuses such as a multifunction printer, a PC (Personal Computer), and the like.

In a network device of the above-mentioned typical technology, the network interface is automatically restarted only when a setting change of the network interface is performed. Therefore, it is possible to prevent the user from forgetting to restart after changing the settings without causing the user to be aware of the restart operation.

Incidentally, when delivering the above-described image forming apparatus to a client, for example, setup may be executed with contents according to a request from the client before delivery. Moreover, when the number of apparatuses delivered to a client is large, a plurality of image forming apparatuses may be set up collectively via a network.

In such a collective setup of image forming apparatuses via a network, for example, a DHCP (Dynamic Host Configuration Protocol) server automatically assigns an IP (Internet Protocol) address to each image forming apparatus. As a result, the setup may be efficiently executed according to the instruction from a setup terminal.

However, depending on the client, an IP address may be specified for all image forming apparatuses or some image forming apparatuses of the plurality of image forming apparatuses. This is because, for example, in a case of connecting a delivered image forming apparatus and a user terminal or the like, and an IP address is not specified for the image forming apparatus, it becomes impossible to connect the delivered image forming apparatus and the user terminal or the like.

In this case, as in the setup with the network device according to the typical technology described above, when a setting value is rewritten, it is conceivable to notify that the network interface needs to be restarted. However, up until the time of delivery of the image forming apparatuses to the client, for example, there may be a request or the like from the client for re-setup, and the IP addresses may be automatically assigned to each image forming apparatus by the DHCP server again. In this case, after completion of the re-setup, it is necessary again to change the IP address to the contents specified by the client, which is inefficient.

With the electronic apparatus and the non-transitory computer-readable recording medium according to the present disclosure, when a time included in reservation information is reached after completion of setup by a setup terminal, the start of a setting change is received and a setting change process is executed, so a setting change after completion of setup may be executed efficiently.

What is claimed is:

1. An electronic apparatus comprising:
   a panel unit;
   a reservation information management unit that holds and manages reservation information including a time of a reservation date and time of a setting change after setup completion set by a setup terminal and contents of the setting change; and
   a system control unit that, when the reservation information management unit holds the reservation information, after receiving a notification from the reservation information management unit indicating that the time of the reservation date and time has been reached, executes a process of the setting change according to the contents of the setting change; wherein
   the system control unit, after receiving the notification from the reservation information management unit, causes the panel unit to display a reservation notification screen, and after receiving a start of the setting change via the reservation notification screen, executes the process of the setting change; and wherein
   the reservation information is set by the setup terminal at the time of the setup, and
   the time is a first starting of the electronic apparatus after completion of the setup, or a first starting on a delivery date of the electronic apparatus after completion of the setup.

2. The electronic apparatus according to claim 1, wherein the system control unit, after receiving a change in the time of the reservation date and time via the reservation notification screen, causes the time of the reservation date and time to be changed.

3. The electronic apparatus according to claim 1, wherein the content of the setting change is connection information via a network.

4. A non-transitory computer-readable recording medium that stores a network setting program executable on a computer of an electronic apparatus; wherein when the computer executes the network setting program;
   a reservation information management unit holds and manages reservation information including a time of a reservation date and time of a setting change after setup completion set by a setup terminal and contents of the setting change;
   a system control unit, when the reservation information management unit holds the reservation information, after receiving a notification from the reservation information management unit indicating that the time of the reservation date and time has been reached, executes a process of the setting change according to the contents of the setting change; and further
   the system control unit, after receiving the notification from the reservation information management unit, causes a panel unit to display a reservation notification screen, and after receiving a start of the setting change via the reservation notification screen, executes the process of the setting change; and further
   the reservation information is set by the setup terminal at the time of the setup, and
   the time is a first starting of the electronic apparatus after completion of the setup, or a first starting on a delivery date of the electronic apparatus after completion of the setup.

* * * * *